May 29, 1951     O. E. WOLFF ET AL     2,554,890
PHOTOGRAPHIC APPARATUS

Filed May 5, 1948     3 Sheets-Sheet 1

INVENTORS
Otto E. Wolff
Murry N. Fairbank
and
Charles O. Rolando
BY Donald L. Brown
and
Oliver W. Hayes
Attorneys May 29, 1951     O. E. WOLFF ET AL     2,554,890
PHOTOGRAPHIC APPARATUS Filed May 5, 1948     3 Sheets-Sheet 3

INVENTORS
Otto E. Wolff
Murry N. Fairbank
and
Charles O. Rolando
BY Donald C. Brown
and
Oliver H. Hayes
Attorneys Patented May 29, 1951

2,554,890

UNITED STATES PATENT OFFICE 2,554,890

PHOTOGRAPHIC APPARATUS

Otto E. Wolff, Cambridge, and Murry N. Fairbank and Charles O. Rolando, Belmont, Mass., assignors to Polaroid Corporation, Cambridge, Mass., a corporation of Delaware Application May 5, 1948, Serial No. 25,224

4 Claims. (Cl. 95—13)

1

This invention relates to photography and more particularly to novel photographic apparatus which is an improvement over that shown in Patent No. 2,435,717, which patent shows a photographic apparatus such as a camera wherein negative and positive sheets may be separately mounted in the camera and negative and positive images may be concurrently produced in the two sheets by bringing said two sheets into face-to-face relation and releasing a liquid from one of said sheets and spreading said liquid between the two sheets.

A principal object of the present invention is to provide improved means for mounting the roll of positive sheet material.

Other objects of the invention are to provide a camera of the above type permitting easy loading thereof; to provide a camera having a simplified construction and operation; to provide improved positive sheet-holding and guiding means; to reduce the cost of such a camera and to increase its reliability.

These and other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein.

Figure 1:
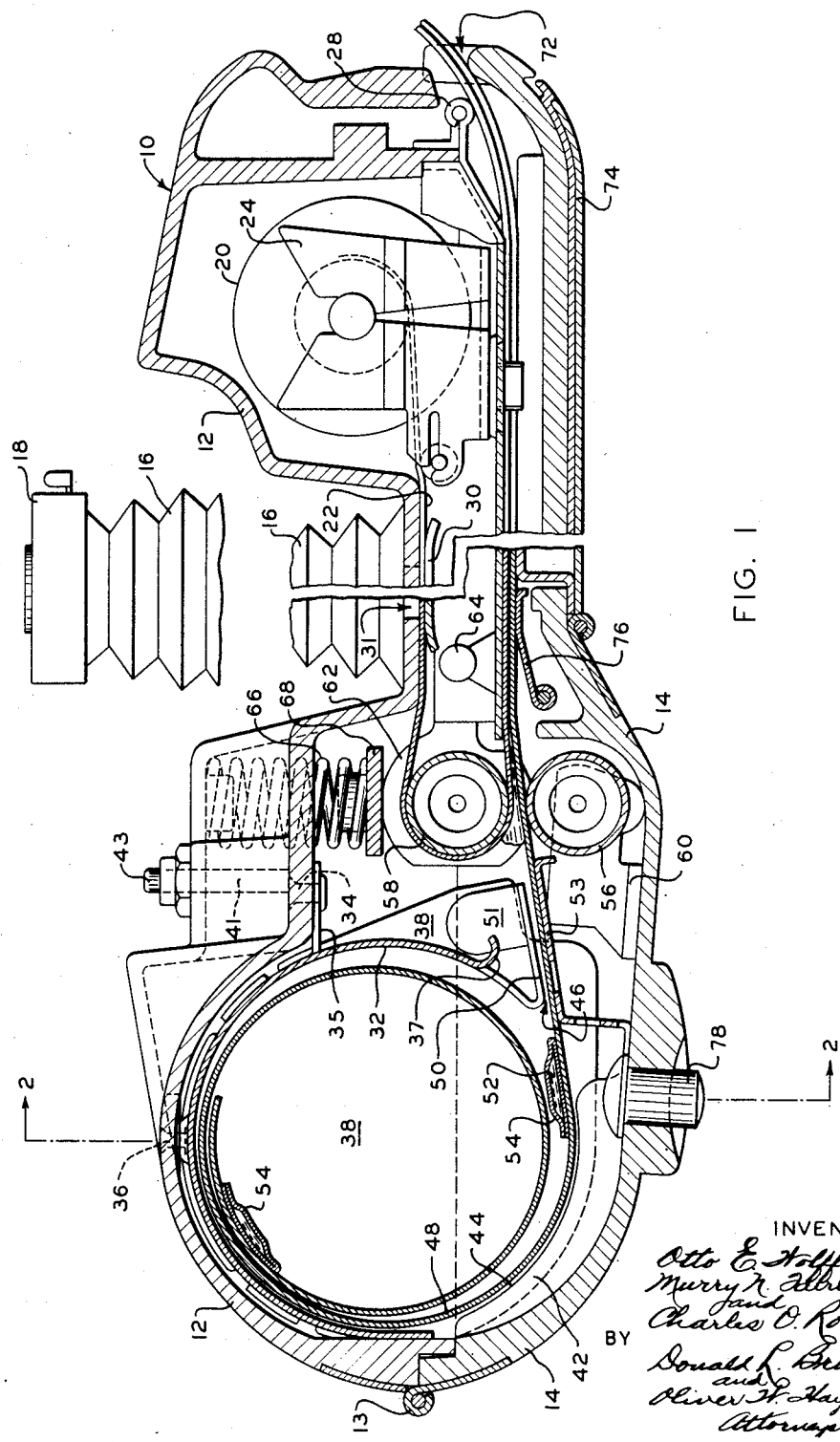
Figure 1 is a diagrammatic fragmentary sectional view of one preferred modification of the invention shown in the form of a hand-held camera, the right-hand portion of Fig. 1 being a section along the near edge of the camera and the left-hand portion of Fig. 1 being a section along the center line of the camera.

In general, this invention relates to cameras of the type comprising means for holding a roll of photosensitive sheet such as a commercial silver halide photosensitive film, means for exposing sequential areas of the photosensitive film and means for processing the exposed silver

2 halide area to at least develop a negative image therein, by spreading a processing liquid between the exposed area and another sheet also supplied by the camera. This second sheet preferably supports a plurality of liquid-carrying containers at spaced intervals on one surface thereof, this surface being brought into face-to-face relation with the exposed image area of the silver halide photosensitive film and the processing is accomplished by passing the thus superposed film and sheet between a pair of pressure rolls carried by the camera to cause the release and spreading of the liquid between corresponding areas of the film and sheet. The above processing preferably produces a positive image on the second sheet and this latter sheet is hereinafter referred to as a positive image-receiving sheet. The present invention is more particularly directed to improvements in the means for holding this positive image-receiving sheet.

In a preferred form of the present invention the camera comprises a front housing holding a suitable lens and shutter and a rear housing forming a light-tight body with the front housing. Suitably associated with the front housing is a means for supporting a spool carrying a roll of photosensitive film. The rear housing is preferably pivotally connected to the front housing and defines, with portions thereof, a space in which a roll of receiving-sheet material may be held. Since this second roll carries a plurality of containers thereon it is preferably rolled in a coil without the use of a spool. This coil of receiving-sheet material is thus under a stress tending to uncoil the sheet. Those portions of the two housings which cooperate to hold the coil of receiving sheet are so arranged as to confine this coil to a predetermined space and to permit the withdrawal thereof from this space in a predetermined path, this path preferably guiding the receiving sheet into superposition with the negative film at a constant angle.

In a preferred form of the invention the rear housing is pivoted to the front housing adjacent that end thereof which is to hold the receiving sheet. Means are associated with the front housing for defining segmental surfaces which are substantially concentric, these surfaces defining portions of a substantially cylindrical chamber. These segmental surfaces define a surface preferably having an arcuate dimension greater than a semicylinder, but less than a cylinder, thereby leaving an opening facing the rear housing which is large enough to permit introduction of the receiving sheet coil into this chamber. Means are also preferably associated with the front housing for defining surfaces adjacent the margins of the receiving sheet to maintain this sheet in a planar path during withdrawal from the chamber. This latter means preferably maintains the container-carrying portion of the sheet spaced from the terminal portion of the above chamber-defining means during withdrawal, so as to obviate the possibility of inadvertently bursting the container. Associated with the rear housing is a means defining other segmental surfaces which are substantially concentric, these surfaces defining the remaining portion of the cylindrical chamber, this latter means including a curved segmental surface having an arcuate dimension preferably less than a semicylinder. The rear housing also preferably carries another means defining a planar surface, cooperating with the planar margin-guiding means of the front housing, to guide the receiving sheet in the above-mentioned planar path. When the rear housing is moved to closed relationship with respect to the front housing, the chamber-defining means associated with the two housings cooperate to form an almost completely enclosed cylindrical chamber for holding the receiving sheet coil.

Referring now to Fig. 1 there is shown a diagrammatic fragmentary sectional view of one preferred form of the invention as embodied in a hand-held camera. In this figure, 10 indicates the camera body which comprises a front housing 12 and a rear housing 14 preferably hingedly secured thereto, as at 13. The front housing 12 carries a usual bellows 16 supporting a lens and shutter assembly indicated at 18. For holding a spool 20 of photosensitive film 22, there is provided a spool holder 24 secured to a partition member 26 pivoted to the front housing 12 at 28. This partition 26 also supports a backing plate 30 which holds the film 22 flat in the focal plane of the camera behind an exposure opening 31.

Figure 2:
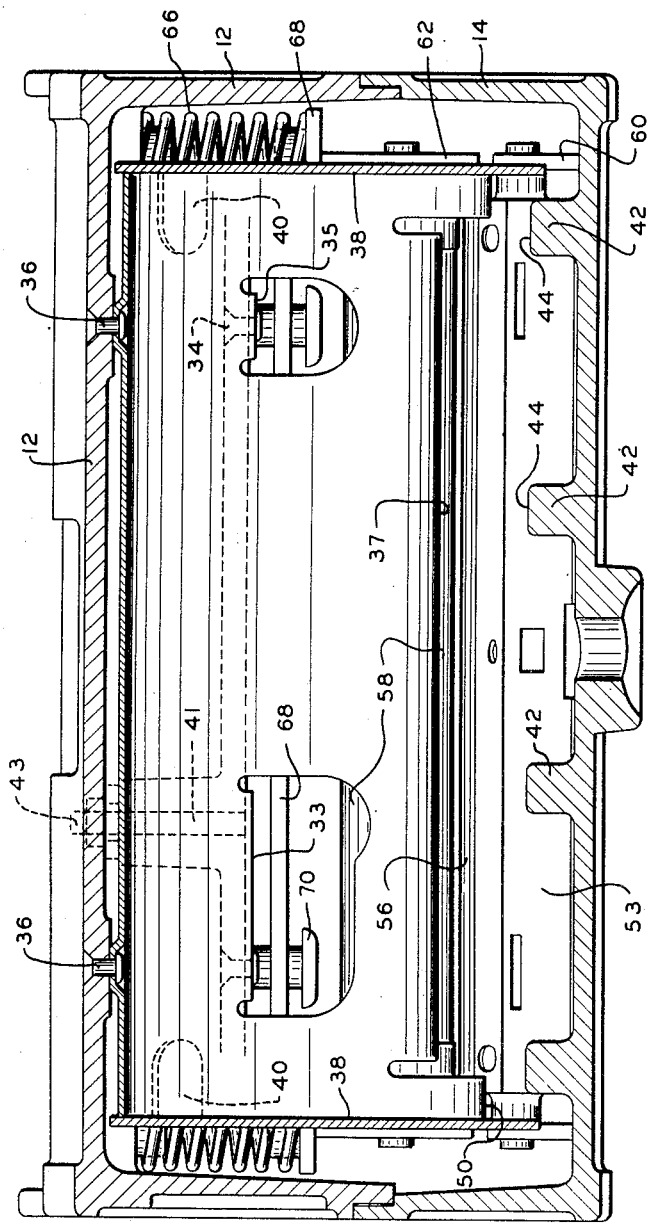
Fig. 2 is a sectional view of Fig. 1 taken along the line 2—2.

Referring now to Fig. 2, as well as Fig. 1, the preferred form of holder for a receiving sheet 48 is shown in detail. This holder comprises, in part, a segmental chamber-defining means associated with the front portion 12, and shown in a preferred form, at 32, as comprising a metal shell-like member having a segmental cylindrical inner surface. An intermediate transverse terminal portion of chamber-defining member 32 is cut away and bent outwardly at 37 to define a smoothly curved transverse terminal edge therefor. For securing the member 32 to front housing 12 there is provided a pair of integral tabs 33 and 35 (Fig. 2) formed therefrom. These tabs are preferably secured to the housing by means such as rivets 34. The right-hand side of tab 33 (Fig. 2) covers a hole 41, in housing 12, containing a cover-opening spring member 43. Rivets 36 also preferably secure the top portion of member 32 to front housing 12. The two ends of cylindrical member 32 are closed by end plates 38 which are preferably of larger area than a circular section of the cylindrical sheet-holding chamber. These end plates are preferably secured to member 32 by means such as bent-over tabs 40. As can be seen, particularly in Fig. 1, member 32 comprises a segmental chamber-defining surface having an arcuate dimension greater than 180°.

Cooperating with chamber-defining member 32 is another means associated with rear cover 14, this means comprising a plurality of ribs 42 having segmental surfaces 44 which are substantially concentric with the inner surface of member 32. These segmental rib surfaces 44 have an arcuate dimension less than 180° and provide, with the segmental surface of member 32, a substantially cylindrical chamber having an opening 46 through which the receiving sheet 48 may pass along a plane which is preferably tangent to the cylindrical chamber-defining surface. That portion of opening 46 adjacent outwardly curved terminal portion 37 is considerably wider than the remainder thereof, so as to permit passage of a container 54 secured to the surface of sheet 48.

For guiding the receiving sheet as it passes through opening 46 the member 32 preferably includes extensions 50 defining sheet-margin-engaging surfaces, extensions 50 being secured to end plates 38 by tabs 51. Cooperating with the surfaces of extensions 50 is a path-defining member 53, carried by rear housing 14, this member having a surface substantially parallel to surfaces 50, these surfaces holding the sheet 48 in the tangent discharge plane during withdrawal thereof. The margin-guiding surfaces 50 have the additional important function of maintaining the sheet spaced from terminal portion 37 of member 32 so that the container 54 does not touch this portion 37 during withdrawal.

For processing the exposed photosensitive film 22 by releasing a liquid 52, carried by a container 54 secured to sheet 48, and spreading the released liquid between the film and sheet, there is provided a processing means shown as preferably comprising a pair of pressure rolls 56 and 58. Lower roll 56 is preferably carried by a bracket 60 secured to rear housing 14 while upper roll 58 is preferably carried by a pair of pivoted arms 62 secured, by a pin 64, to partition 26. For resiliently loading the rolls 56—58, there is included a pair of springs 66 which bear on a pressure bar 68 which, in turn, engages arms 62. A pair of retainer pins 70 (Fig. 2) prevents more than a predetermined movement of pressure bar 68 with respect to front housing 12.

As can be seen from Fig. 1, the sheet-guiding members 50 and 53 define therebetween a path along which the sheet is guided at a constant angle towards the pressure rolls 56 and 58. The angle at which the sheet 48 is superposed with photosensitive film 22 thus remains substantially constant. This arrangement is of assistance in maintaining constant the thickness of spread of liquid between the two sheets.

The rear cover 14 defines, with partition 26, a dark chamber which extends from the pressure rolls 56—58 to the right-hand end of the camera where a mouth 72 is formed by cooperating parts of the front and rear housings. For providing access to this dark chamber there is included a door 74 in rear cover 14. A light-seal blade prevents passage of light from the door, when opened, to the pressure roll portion of the camera interior. A stop release button 78 is shown in Fig. 1 but the stop is not shown, this stop being indicated in Figs. 3 and 4 and fully described and claimed in the copending application of Murry N. Fairbank, Serial No. 15,138, filed March 16, 1948 (now Patent No. 2,543,159, issued February 27, 1951). Suitable latches and light seals are provided for maintaining the light-tightness of the interior of the camera housing.

In the use of the camera shown in Figs. 1 and 2, the rear housing portion 14 is swung open, partition 26 is swung open and the camera is held with the opened interior extending upwardly. A spool 20 of photosensitive film 22 is placed in the spool holder 24 carried by partition 26. A leader portion of the film 22 is led across backing plate 30, fed between the two arms 62 and brought around roll 58. The partition 26 is then moved to closed position. A coil of image-receiving sheet 48 is now placed in the chamber defined by member 32 and a leader portion of sheet 48 is fed past margin-guiding means 50, aligned with the leader portion of the film 22 and the two leaders are pulled along the back of partition 26 until they extend past the right-hand end of the camera. The rear housing 14 is now swung to closed position, thus moving the receiving sheet chamber-defining surfaces 44 and guiding means 53 into operative relationship with chamber-defining member 32 and guiding surfaces 50. This movement of the rear housing 14 also brings roll 56 into operative position with roll 58 and creates the dark chamber between housing 14 and partition 26. When the camera interior has been made light-tight by moving the rear housing 14 to closed position, the camera is ready for use. Those portions of the leaders extending from mouth 72 are now pulled to position a photosensitive area in the focal plane of the camera, this movement bringing a container 54 into position where it is ready to pass between the rolls 56—58. The correct positioning of the photosensitive area and container is preferably assured by means of a stop of the type described hereinafter in connection with the discussion of Fig. 3. This positioning may, however, be obtained by other means such as visual indicia.

Exposure of the photosensitive image area is next made by operating the shutter 18 and the exposed area is processed by pulling those portions of the two layers extending from mouth 72. During withdrawal of the receiving sheet from the cylindrical chamber therefor it is guided in a predetermined path into convergence with the other sheet. The maintenance of this path fixed with respect to the pressure rolls has the advantage that the liquid spread by the rolls between the various sheets will be uniform within each image area and the first image area will have substantially the same thickness of spread as the last image area. This is due to the fact that spread thickness is a function, among other things, of the effective angle of convergence of the two sheets. If this angle is maintained constant one important condition is satisfied for uniformity of spread liquid.

The liquid 52 released from container 54 by rolls 56—58 and spread between the exposed area of film 22 and a corresponding area of receiving sheet 48 laminates these layers together. The processing liquid 52 preferably accomplishes at least the development of a latent negative and also preferably concurrently forms a positive image on receiving sheet 48, this processing taking place while the two laminated layers are within the dark chamber defined by rear housing 14 and partition 26. When the processing is completed, at the end of about a minute, rear door 74 is opened and the positive-image-bearing portion of receiving sheet 48 is separated from the lamination, this separation being preferably aided by preforations in the receiving sheet surrounding the image-bearing portion thereof. The processing movement of the two sheets which provides for spreading of the liquid also moves the succeeding area of the photosensitive film into exposure position. When exposure of this succeeding area is accomplished, the processing thereof is obtained by pulling those portions of the preceding sheets which extend from mouth 72.

Figure 3:
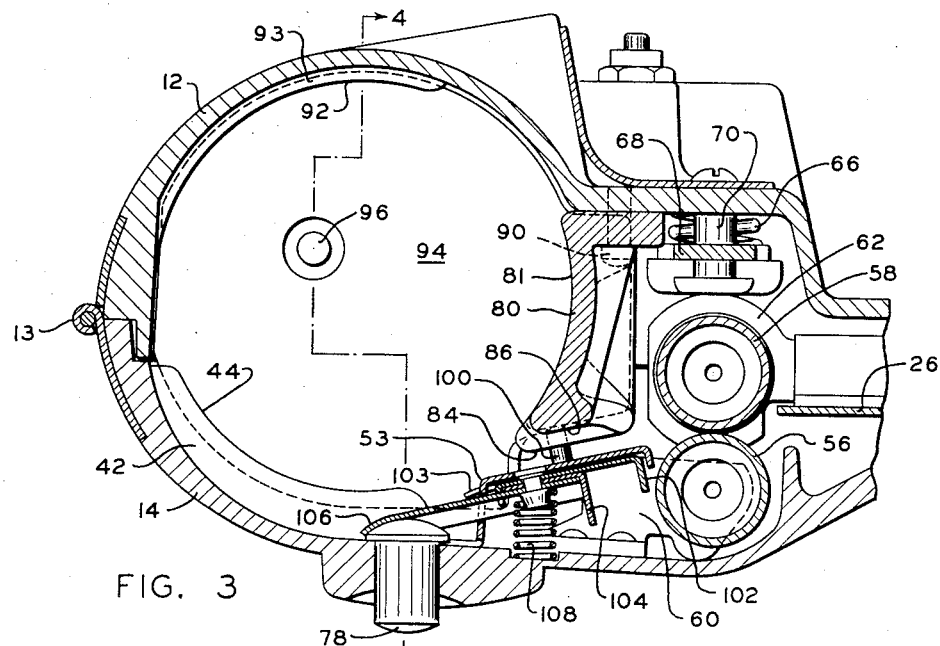
Fig. 3 is a diagrammatic fragmentary sectional view of another form of the invention.
Figure 4:
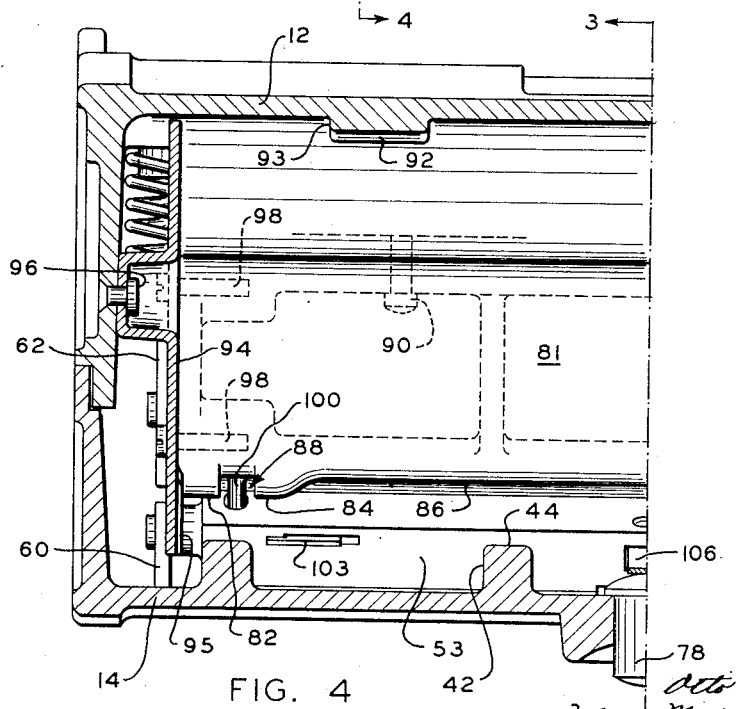
Fig. 4 is a sectional view of Fig. 3 taken along the line 4—4.

Referring now to Figs. 3 and 4 where like numbers refer to like elements in the preceding figures, there is shown another modification of the invention. In this form of the camera, a portion of the chamber-defining means associated with the front housing comprises a curved block member 80 secured, such as by a rivet 90, to the front housing 12. An interior curved surface 81 of block 80 is substantially concentric with another portion of the chamber-defining means comprising interior curved surfaces 92 on a pair of ribs 93, preferably formed integrally with the housing 12. As can be seen, surfaces 81 and 92 define segmental portions of a cylindrical surface, which surface, including the space between said portions, has a total included arcuate dimension greater than 180°. The two ends of block 80 have terminal portions thereof that extend further towards the rear housing than does the central terminal part of the block. In a preferred form there are two of these extending portions at each end, these being shown at 82 and 84 in Fig. 4. These portions 82 and 84 define a slot 88 therebetween in which a stop pin 100 is adapted to move. The intermediate terminal portion of block 80 is shown at 86, this portion being spaced further from rear housing 14 than end portions 82 and 84. These end portions 82 and 84 prevent contact of the container with the intermediate terminal portion 86 of the block during withdrawal of the sheet. For forming sheet-guiding extensions, surfaces 82 and 84 are continued along a considerable distance towards the pressure rolls. Cooperating with these surfaces is the plate member 53 carried by rear housing 14. This plate also supports a second plate 102 which is pivotally secured to plate 53 by lugs 103. This latter member 102 carries a spring member 104 which is provided, on its extremities, with the pair of stop pins 100. For rotating the stop pins in a clockwise direction, as seen in Fig. 3, there is provided a lever 106 adapted to be moved by pushing button 78. For normally urging stop pin 100 upwardly into the position shown in Fig. 3, there is provided a weak spring 108.

The ends of the cylindrical chamber for holding the receiving sheet are provided by a pair of flat end plates 94. These plates are secured to walls of the front housing 12 by means such as rivets 96 and to block member 80 by means such as screws 98 (Fig. 4). End plates 94 are preferably provided with inwardly tapered tabs adjacent sheet-guiding surfaces 82, these tabs being shown at 95 and being designed to prevent transverse movement of the sheet as it leaves the holding chamber.

The arrangement of guiding surfaces 82—84, associated with block 80, and the cooperating surface of plate 53 provides a narrow path along which the receiving sheet is fed to the pressure rolls. As can be seen this path makes an angle with the tangent plane passing between the rollers. It can be seen that the angle of convergence of the film and the sheet will be substantially equal to the sum of the angles of convergence of these sheets with respect to this tangent plane, this angle remaining substantially constant as the two rolls of sheet material are used up. The inwardly extending tabs 95 additionally prevent sidewise movement of the receiving sheet in its plane of travel.

In the use of the invention of Figs. 3 and 4, the camera is opened up and the two rolls of sheet material are inserted therein as previously described in the discussion of Figs. 1 and 2. The photosensitive sheet is then processed by passing it between the pressure rolls in superposition with the receiving sheet and container, thus releasing and spreading the liquid from the container between these two sheets.

While preferred forms of sheet-holding means have been described above, numerous modifications thereof are feasible within the scope of the invention. For example, the end plates 38 and 94 of Figs. 2 and 4 respectively may be formed integrally with the front housing. There may be more or fewer ribs and these ribs may be entirely eliminated by providing a smooth continuous surface. Equally, the block 80 of Fig. 3 may be formed integrally with front housing 12. Numerous other modifications of the invention, based on the teachings herein, will be apparent to those skilled in the art.

Although the invention has been described in connection with preferred uses thereof, it is not limited thereto. The processing liquid may only develop a negative or may only laminate a light-opaque sheet to the surface of the exposed negative film to form a light-tight sandwich which may be processed by conventional methods. Equally, the photosensitive sheet may comprise photosensitive compounds other than silver halides, such for example as diazonium compounds.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. In a camera of the class comprising a housing structure including a front housing hinged to a rear housing, a pair of processing members within said housing structure, and means for holding a roll of photosensitive film, said processing members being arranged to superpose and compress said film and a sheet material as said film and said sheet material pass between said processing members, the combination with said processing members and said front and rear housings of sheet-holding means comprising an enlarged portion of said front and rear housings adjacent said processing members, said portion of said housings including spaced curved concentric surfaces which, in the aggregate, define a substantially cylindrical surface, some of said surfaces being carried by said front housing and others by said rear housing, the surfaces carried by said front housing forming a receptacle for a coreless coil of said sheet material and being made fully accessible for receiving said coreless coil when the rear housing is pivoted away from said front housing into loading position, extensions of said surfaces providing a withdrawal opening therebetween through which said sheet material contained, in the form of a coreless coil, within the cylindrical chamber defined by said surfaces, may be withdrawn from said chamber, intermediate portions of said withdrawal opening having a dimension normal to said sheet which is greater than the normal dimension of end portions of said withdrawal opening whereby there is provided intermediate said end portions of said withdrawal opening a passage of sufficient width to permit the unrestricted withdrawal from said chamber of a rupturable container mounted on said sheet material intermediate the long edges thereof, the transverse dimension of said withdrawal opening decreasing in the direction of withdrawal, said withdrawal opening being arranged to provide withdrawal of said sheet material at a constant angle with respect to said film as said film and said sheet material are superposed by said processing members.

2. In a photographic apparatus of the class wherein a photosensitive sheet is processed in conjunction with another sheet by means of a viscous processing liquid contained in a plurality of rupturable containers carried at spaced intervals upon said other sheet and wherein said sheets are superposed by and advanced between a pair of pressure-applying members in order to release the liquid from said containers and spread the same between said sheets, the combination with said pressure-applying members of a housing structure for containing said pressure-applying members and comprising a rear housing, a front housing and means hingedly securing together said rear housing and said front housing, means for holding a coreless coil of said container-carrying sheet within said housing structure so that said container-carrying sheet may be fed from said holding means into the bite of said pressure-applying members, said last-named means comprising an enlarged portion of said front housing adjacent said pressure-applying members, said enlarged portion of said housing including means comprising a curved plate having a surface defining a portion of a cylindrical chamber, transverse end terminal portions of said curved plate nearest said rear housing being longer than intermediate terminal portions thereof, said terminal end portions being bent back and extending towards said pressure-applying members to define one side of a path along which said container-carrying sheet passes to said pressure-applying members, flat end plates secured to said curved plate, and means associated with said rear housing defining an internal cylindrical surface arcuately spaced from said curved plate, said last-named surface being movable into substantially concentric relationship with said first-named surface when said front and rear housings are operatively associated, said two surfaces providing a withdrawal opening therebetween through which said container-carrying sheet, coiled within the cylindrical chamber defined by said surfaces, may be withdrawn from said chamber, said end terminal portions of said curved plate maintaining that surface of said container-carrying sheet, to which said containers are secured, spaced from said intermediate terminal portions of said plate during withdrawal of said sheet, said withdrawal opening being arranged to provide withdrawal of said container-carrying sheet along said path at a constant angle with respect to said photosensitive sheet as said photosensitive sheet and said container-carrying sheet are superposed by said pressure-applying members, pivotal movement of said rear housing away from said front housing rendering accessible the portion of the cylindrical chamber in said front housing for receiving the coreless coil of said container-carrying sheet.

3. In a photographic apparatus of the class wherein a photosensitive sheet material is processed in conjunction with another sheet material by means of a viscous processing liquid contained in a plurality of rupturable containers carried at spaced intervals upon said other sheet material and wherein said sheets are superposed by and advanced between a pair of processing members in order to release the liquid from said containers and spread the same between said sheets, the combination with said processing members of a housing structure for containing said processing members and comprising a rear housing, a front housing and means hingedly securing together said rear housing and said front housing, and means for holding a coreless coil of said container-carrying sheet material within said housing structure so that said sheet material may be fed from said last-named coil-holding means into the bite of said processing members, said sheet-holding means comprising an enlarged portion of said front housing adjacent said processing members and on the opposite side of said processing members from said opening, said enlarged portion of said housing including means defining a portion of an internal cylindrical surface, means associated with said rear housing defining another portion of an internal cylindrical surface, said last-named surface being movable into substantially concentric relationship with said first-named surface when said front and rear housings are operatively associated to provide a cylindrical chamber for holding a coreless coil of said sheet material, said two surfaces providing an opening therebetween through which said container-carrying sheet material may be withdrawn from said chamber, and sheet-margin-engaging surfaces associated with said front housing adjacent ends of said withdrawal opening for maintaining that surface of said container-carrying sheet material, to which said containers are secured, spaced during withdrawal from that portion of said first surface-defining means which cooperates to form intermediate portions of said withdrawal opening precluding premature rupture of said containers, said sheet-margin-engaging surfaces being arranged to provide movement of said container-carrying sheet material at a constant angle with respect to said photo-sensitive sheet material as said photo-sensitive sheet material and said container-carrying sheet material are superposed by said processing members.

4. In a photographic apparatus of the class wherein a photosensitive sheet material is processed in conjunction with another sheet material by means of a viscous processing liquid contained in a plurality of rupturable containers carried at spaced intervals upon said other sheet material and wherein said sheets are superposed by and advanced between a pair of processing members in order to release the liquid from said containers and spread the same between said sheets, the combination with said processing members of a housing structure for containing said processing members and comprising a rear housing, a front housing and means hingedly securing together said rear housing and said front housing, and means for holding a coreless coil of said container-carrying sheet material within said housing structure so that said container-carrying sheet material may be fed from said holding means into the bite of said processing members, said last-named means comprising an enlarged portion of said front housing adjacent said processing members, said enlarged portion of said housing including means defining an internal cylindrical surface, a block having a curved surface secured to said front housing adjacent said internal cylindrical surface thereof and constituting an extension of said surface, said curved surface extending around a transverse terminal portion of said block and defining one side of a path along which said container-carrying sheet material passes to said processing members, ends of said transverse terminal portions of said block extending further towards said rear housing than intermediate terminal portions thereof, and means associated with said rear housing defining an internal cylindrical surface, said last-named surface being movable into substantially concentric relationship with said first-named surface when said front and rear housings are operatively associated, said two surfaces providing a withdrawal opening therebetween through which said container-carrying sheet material, contained within the cylindrical chamber defined by said surfaces, may be withdrawn from said chamber, said ends of said terminal portion of said block maintaining that surface of said sheet material, to which said containers are secured, spaced from said intermediate terminal portions thereof during withdrawal of said container-carrying sheet material through said withdrawal opening precluding premature rupture of said containers, said withdrawal opening being arranged to provide withdrawal of said container-carrying sheet material along said path at a constant angle with respect to said photosensitive sheet material as said photosensitive sheet material and said container-carrying sheet material are superposed by said processing members.

OTTO E. WOLFF.
MURRY N. FAIRBANK.
CHARLES O. ROLANDO.

REFERENCES CITED

The following references are of record in the file of this patent:

UNITED STATES PATENTS

| Number | Name | Date |
|---|---|---|
| 1,057,412 | Dey | Apr. 1, 1913 |
| 1,424,816 | Grillone | Aug. 8, 1922 |
| 2,256,981 | Klein | Sept. 23, 1941 |
| 2,257,424 | Meyer | Sept. 30, 1944 |
| 2,378,406 | Harris | June 19, 1945 |
| 2,381,033 | Bolsey | Aug. 7, 1945 |